United States Patent
Schlagmuller et al.

[15] 3,662,987
[45] May 16, 1972

[54] INJECTOR VALVE

[72] Inventors: Walter Schlagmuller, Buetthard; Rudolf Babitzka, Ludwigsburg-Hoheneck, both of Germany

[73] Assignee: Robert Bosch GmbH, Stuttgart, Germany

[22] Filed: Feb. 24, 1970

[21] Appl. No.: 13,617

[30] Foreign Application Priority Data

Feb. 28, 1969 Germany.....................P 19 10 113.4

[52] U.S. Cl. ............................................................251/139
[51] Int. Cl. ..........................................................F16k 31/06
[58] Field of Search..................................................251/139

[56] References Cited

UNITED STATES PATENTS

| | | | |
|---|---|---|---|
| 3,004,720 | 10/1961 | Knapp et al.............. | 251/131 X |
| 3,420,496 | 1/1969 | Hallberg................... | 251/141 |
| 1,538,092 | 5/1925 | Cole.......................... | 251/139 |
| 3,324,889 | 6/1967 | Batts......................... | 251/139 X |
| 3,450,353 | 6/1969 | Eckert....................... | 251/141 X |
| 2,687,277 | 8/1954 | Bremer et al............. | 251/139 |

FOREIGN PATENTS OR APPLICATIONS

| | | | |
|---|---|---|---|
| 880,369 | 10/1961 | Great Britain............ | 251/139 |

*Primary Examiner*—Arnold Rosenthal
*Attorney*—Michael S. Striker

[57] ABSTRACT

An outer valve jacket having an open end accommodates an electromagnetic actuator inwards of the open end. The electromagnetic actuator comprises a solenoid-energized iron core and an armature reciprocable towards and away from the open end, the latter enclosing at least part of a valve housing and a valve needle in the valve housing. The valve needle is coaxially reciprocably connected with the armature and axially movable in the valve housing between a valve opening and a valve closing position. The valve housing is secured in the open end of the outer jacket in such a way that a circumferential portion of the jacket is radially inwardly upset and accommodated in at least one circumferential groove in the valve housing, the latter having an outer diameter substantially equal to the inner diameter of the outer jacket.

1 Claim, 1 Drawing Figure

Patented May 16, 1972
3,662,987
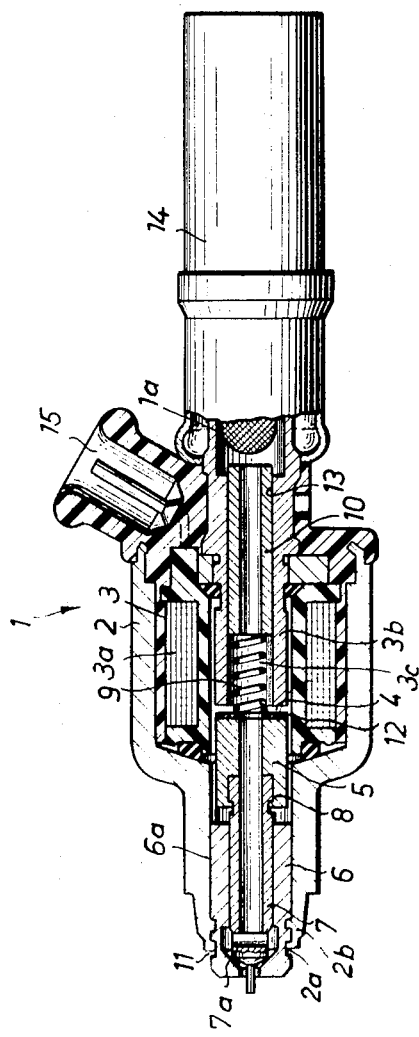
INVENTORS
Walter SCHLAGMÜLLER
Rudolf BABITZKA
By
their ATTORNEY

INJECTOR VALVE

BACKGROUND OF THE INVENTION

The present invention relates to an electromagnetically actuatable injector valve, particularly for time-controlled low pressure fuel injectors of internal combustion engines, for example those types with suction pipe injection.

Injector valves of this type employ a steel outer valve jacket and a solenoid-operated iron core fixed in the valve jacket and which alternately attracts and expels a coaxially arranged but spaced armature movably coupled with a valve needle which is axially reciprocable in a valve housing to open and close a valve seat therein in response to attraction or expulsion of the armature by the core.

The valve housing of such conventional injector valves is constructed such that its outer circumferential surface defines portions of different diameter and the valve housing is inserted into the valve jacket to a predetermined extent till it engages an abutment in the jacket. Fixation of the valve housing in the valve jacket is accomplished by inward flanging of overlapping portions of the jacket in that region of the valve housing where its outer surface has a diameter different from those of adjoining portions.

However, such a connection between the valve housing and the valve jacket is disadvantageous in that the outer surface of the valve housing is to be provided with predetermined portions of different diameter which, as is self-evident, complicates the manufacture of the valve housing and hence renders it uneconomical.

In addition, and with regard to the assembly of such valve jackets and housings, the latter can only be inserted into the jackets by a predetermined length.

SUMMARY OF THE INVENTION

Object of the present invention is to overcome the above disadvantages and to provide an electromagnetically actuatable injector valve with a simple, economical valve housing which can easily be inserted by any desired length into a cooperating valve jacket and which easily and economically can be connected to the same.

Such an electromagnetically actuatable injector valve, particularly for internal combustion engines comprises an outer valve jacket having an open end and accomodating an electromagnetic actuator inwards of the open end, the actuator comprising an armature reciprocable towards and away from the open end. A valve housing extends at least in part inwards of the open end and a valve member is movably accomodated in the valve housing and reciprocably coupled with the armature between a valve opening and a valve closing position. Connecting means connect the valve housing with the outer jacket and comprises at least one circumferential groove provided in the outer circumferential surface of the valve housing, and a portion of the outer jacket in the region of the open end thereof and which extends into the at least one circumferential groove.

The novel features which are considered as characteristic of the invention are set forth in particular in the appended claims. The improved injector valve itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWINGS

The single FIGURE in the drawings is a cross sectional view of an electromagnetically actuatable injector valve according to the present invention.

DESCRIPTION OF THE PREFERRED EMBODIMENTS

The single FIGURE illustrates an electromagnetically actuatable injector valve, generall indicated at 1, and which is seen to comprise a steel valve jacket 2 and an electromagnetic actuator assembly 3 accomodated in the interior of the jacket 2.

The actuator assembly 3 comprises a solenoid 3a which surrounds a core of iron 3b, and an armature 5 coaxially with the core 3b via an air gap 4 and alternately axially attracted and expelled by the core 3b, in conventional manner.

The core 3b is substantially annular and defines a bore 13 therethrough.

Accomodated, in part, in the bore 13 is a spring member 9 which serves to constantly bias the armature 5 in direction away from the core 3b and in direction toward the open end 2a of the jacket 2.

Further provided in the bore 13 is a bushing member 10 which determines the bias of the spring 9 on the armature 5.

The bushing member 10 may be arranged so that it is permanently adjustable, in which case it may be threadably accomodated in the bore 13, or it may serve to only once set a predetermined pressure of the spring 9 and is then upset with respect to the bore 13 to lock it in the same.

Disposed in the air gap 4 intermediate the iron core 3b and the armature 5, is a disc-shaped non-ferromagnetic member 12 which serves to prevent sticking of the armature 5 to the core 3b upon de-energization of the latter.

Coaxially coupled to the armature 5 by means of a press fit 8, is a valve needle 7 which is reciprocable with the armature 5 and axially movable in a valve housing 6 between a valve closing position in which it engages and closes a valve seat 7a and a valve opening position in which it disengages and opens the valve seat and in which latter condition the armature 5 engages the core 3b against the bias of the spring 9 and via the disc-shaped non-ferromagnetic member 12. The armature also is upset relative to the valve needle to provide an additional connection.

The extent of axial displacement of the armature 5 and valve needle 7 is substantially equal to the width of the air gap 4.

This axial displacement of the armature and valve needle may be initially varied by means of the valve housing 6, i.e., by varying the degree of insertion of the latter into the jacket 2, the extent of axial displacement of the armature and valve is correspondingly varied.

The valve housing 6 has an outer circumferential surface 6a in which a plurality of parallel circumferential grooves 11 (two shown) are provided.

Upon determining and setting the desired degree of insertion of the valve housing 6 into the jacket 2 to thereby obtain the desired displacement of the valve needle 7, the overlapping circumferential portion 26 of the jacket in the region of its open end 2a, is radially inwardly upset into the respective underlying groove or grooves 11. In this manner, the valve housing 6 is rigidly secured in the open end 2a of the jacket 2.

A fuel pipe 14 is connected at the inlet end 1a to supply fuel to the injector valve 1 and an electrical connection 15 connects the solenoid 3a to an electric power system, not shown.

It will be understood that each of the elements described above, or two or more together, may also find a useful application in other types of injector valves differing from the types described above.

While the invention has been illustrated and described as embodied in the single Figure, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. An electromagnetically actuable injection valve, particularly for internal combustion engines, comprising an outer jacket having an open end and a thin wall in the region of said open end; an electromagnetic actuator inwards of said open end and comprising an armature reciprocable towards and away from said open end; a valve housing in said outer jacket and extending at least in part inwards of said open end; a valve member in said housing and reciprocable with said armature between a valve opening and a valve closing position; and connecting means connecting said valve housing with said outer jacket and comprising two circumferentially parallel grooves provided in an outer circumferential surface of the valve housing and two parallel radially inwardly upset sections of said outer jacket in the region of said open end and accommodated in said two parallel grooves.

* * * * *